(Model.) 2 Sheets—Sheet 2.
J. MOFFAT & W. W. VIRTUE.
FLEXIBLE SHAFTING AND COUPLING ATTACHMENT THEREFOR.
No. 497,590. Patented May 16, 1893.
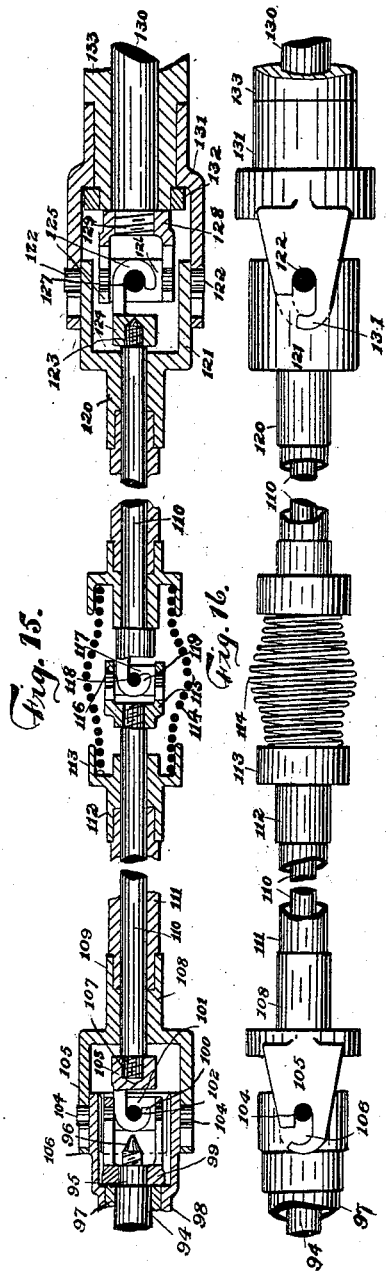
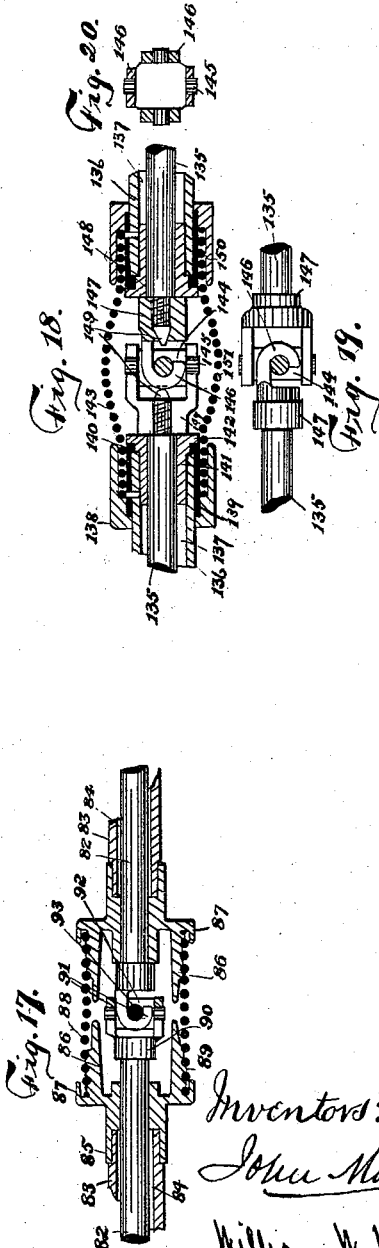

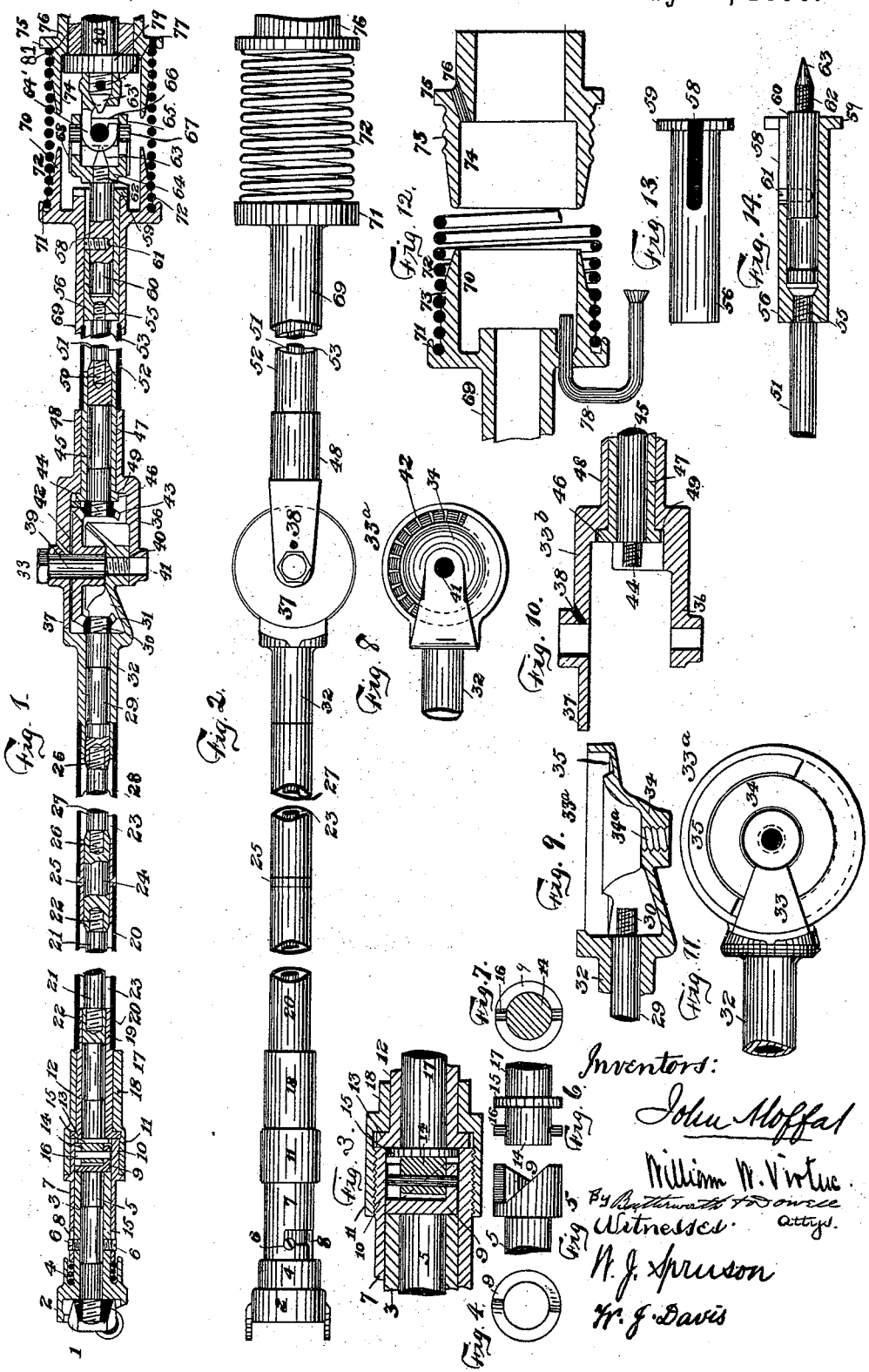
(Model.) 2 Sheets—Sheet 1.
J. MOFFAT & W. W. VIRTUE.
FLEXIBLE SHAFTING AND COUPLING ATTACHMENT THEREFOR.
No. 497,590. Patented May 16, 1893.

UNITED STATES PATENT OFFICE.

JOHN MOFFAT AND WILLIAM W. VIRTUE, OF SYDNEY, NEW SOUTH WALES.

FLEXIBLE SHAFTING AND COUPLING ATTACHMENT THEREFOR.

SPECIFICATION forming part of Letters Patent No. 497,590, dated May 16, 1893.

Application filed January 4, 1892. Serial No. 417,009. (Model.) Patented in New South Wales March 4, 1891, No. 2,846.

*To all whom it may concern:*

Be it known that we, JOHN MOFFAT and WILLIAM WRIGHT VIRTUE, subjects of the Queen of Great Britain, and residents of Sydney, in the Colony of New South Wales, have invented certain new and useful Improvements in Flexible Shafting for Transmitting Rotary Motion and in Coupling Attachments Therefor, (patented in New South Wales, No. 2,846, March 4, 1891;) and we do hereby declare the following to be a full, clear, and exact description of the invention, such as will enable others skilled in the art to which it appertains to make and use the same.

This invention relates to sectional or jointed shafts with flexible couplings for transmitting rotary motion to portable machines and implements, which in operation are moved about relatively to the point from which the driving power is derived, but more particularly to flexible shafting and coupling attachments adapted for use in imparting rotary motion to shearing machines.

The invention will first be described with reference to the accompanying drawings, which form a part of this specification, and then pointed out in the claims at the end of this description.

Two forms of the invention are illustrated in the drawings, in one of which (Figs. 1 to 14) the shaft is shown as consisting of two rigid sections which are united with one another and with the mechanism from which power is derived and the machine to which power is being transmitted by flexible connections, while in the other form (Figs. 15 to 20) the shaft is constructed in three or more sections which are united by means of universal flexible joints of peculiar construction.

Referring to the drawings by figures of reference, Figure 1, represents a longitudinal section through the shaft and its attachments, and Fig. 2 is a side elevation of the same. Fig. 3 is an enlarged longitudinal section through the clutch gear at the driven end of the shaft. Fig. 4, is an end plan of the socket of the clutch gear. Fig. 5 is a side elevation of the same. Fig. 6, is a side elevation of the stem and key of the clutch gear, and Fig. 7 a transverse section taken at the head of the clutch stem. Fig. 8, is a rear side elevation of the lower casing of the elbow joint. Fig. 9 is a longitudinal section through the lower section of the "elbow" joint casing enlarged. Fig. 10, is a longitudinal section through the upper section of the elbow joint casing enlarged. Fig. 11, is a top view of Fig. 9. Fig. 12 is a longitudinal section through the casing of the "shoulder" joint and part of the head bearing of the shaft. Fig. 13, is a plan of the head clutch socket. Fig. 14, is a longitudinal sectional elevation through the clutch on the head of the shaft. Fig. 15, is a longitudinal section through the head or shoulder joint, and through one of the intermediate joints and the "wrist" coupling of a modified form of flexible shafting. Fig. 16, is a side elevation of same. Fig. 17, is a longitudinal section through one of the intermediate joints. Fig. 18, is a longitudinal section through a modified construction of one of the intermediate joints. Fig. 19, is a longitudinal sectional elevation through the coupling shown in Fig. 18, and Fig. 20, is a transverse section through the center of the latter coupling.

In Figs. 1 and 2, 1 denotes a "rose" wheel and 2 a swing casing of well known construction in sheep shearing machines. The swing casing is formed integrally with a tube bearing 3, within which is fitted a clutch shaft 5; the rose wheel being screwed onto the outer end of said shaft. 7 denotes the clutch tube or sleeve inclosing the tube bearing 3, and having its exteriorly screw threaded inner end 10, screwed into the interiorly screw threaded collar or enlarged end 11 of the adjacent rotatable sleeve or union piece 18, so that when said clutch tube and union piece are joined together they may rotate as one. The inner end of the tube bearing 3 abuts against a collar or enlarged socket-piece 9 formed on the inner end of the clutch shaft 5, so as to confine the shaft in the bearing, and the parts 3 and 7 are detachably connected by a key pin or pins 6 projecting from the part 3 and engaging a bayonet slot or slots 8, in the part 7 as shown; a coiled or other suitable spring 4 being interposed between the outer end of the clutch tube and the swing casing so as to prevent disconnection of the bayonet catch and hold the parts normally locked together. The spring 4, is preferably seated and housed in a cup formed upon the swing casing as shown. The main shaft may consist of a number of shaft sections incased in corresponding tubular sections, the shaft sections being connected by universal joints or couplings and the tube sections connected at their ends by helical springs which are adapted to yieldingly resist flexion of the shaft and tend to set and hold its sections in line with one another.

The connection between the main shaft and the clutch shaft may be made by a detachable clutch coupling shown in detail in Figs. 3 to 7. This coupling may be constructed as follows: Two triangular pieces are cut from the socket piece or cup 9 on the end of the clutch shaft 5 and within the cup is fitted the stem or terminal 14 of the main shaft section 17, which has a key pin or pins 16, projecting therefrom so as to slide along the oblique faces of the cut parts and make contact with the vertical faces thereof for the purpose of actuating the shaft. The bearing section 17 of the main shaft projects through a bushing 12 which is inclosed by the union piece 18 and has a collar 15 thereon near its terminal which abuts against one end of the bushing 12, and said end of the bushing is formed with an annular flange or collar 13, which is confined between the screw-threaded end of the clutch tube and a shoulder within the enlarged end of the union piece. Sufficient surplus clearance is provided in the cup 9 to permit the locking of the bayonet joint. By this construction a substantial connection is made which permits coupling and uncoupling to take place while the shaft is in motion, it being only necessary in uncoupling to give the union piece a partial rotation in order to permit the disconnection of the bayonet joint, and thereupon the clutch shaft and the parts 1, 2, 3, 4, 6 and 9, may be detached from the main shaft and will remain with the machine that is being driven. The bushing 12, about or upon which the union piece 18 may rotate, is screwed or brazed to the adjoining end of a sheath tube or casing 20, the opposite end 28 of which is similarly secured to a tubular extension or sleeve 32 projecting from the lower section of the elbow joint casing, and inclosing a shaft bearing section 29. Intermediate the bushing 12 and sleeve 32 may be placed a bushing 25 within which works the bearing section 24 of the main shaft; the shaft sections 21 and 27, between the bearing sections being reduced to form oil chambers 23 around the reduced portions. The reduced portions 21 and 27 may be turned or formed integrally with the bearing sections 17, 24 and 29, but they are preferably made separate and provided with screw-threaded ends 22 and 26, respectively, which may be screwed into the interiorly screw threaded ends of the bearing sections as clearly shown in Fig. 1. The bearing section 29 has a screw threaded end 30 on which is fitted a bevel wheel or pinion 31 working within the lower section of the elbow joint casing 33 by which the shaft section 29 is connected to and maintained in gear with a shaft section 45, forming a continuation of the main shaft. The elbow casing is constructed in two parts which are shown in detail in Figs. 8 to 11 and in longitudinal section in Fig. 1. The lower (or left hand) section consists of a dished portion or guard cheek 33$^a$ which may be formed integrally with the tubular extension 32 and with a hub 34 through which is formed a screw-threaded aperture 34$^a$ concentric with a semi-circular slot 35 formed near the periphery of the disk. The upper (or right hand) section consists of a bifurcated portion 33$^b$, having a tubular extension 48 and jaws 36, 37, the latter being preferably circular or disk-like in form so that when the two sections are united as shown in Fig. 1, the gearing connecting the shaft sections will be interposed between the disks of the upper and lower sections and protected thereby, the section 33$^a$ being adapted to fit between the jaws 36, 37, of the section 33$^b$, and the two parts being pivoted together by a bolt 39, which passes through apertures in the jaws 36, 37, which register with the aperture 34$^a$. A bevel wheel 42, is journaled upon the pivot pin or spindle 39 which has a reduced partly screw threaded portion 40, screwed into the aperture 34$^a$ of the hub 34, so as to prevent the pin from working loose and dropping out. The teeth of the wheel 42 are arranged over the semi-circular slot 35 and engage a bevel wheel or pinion 43 on the end 44 of the shaft section 45. The shaft sections are thus connected by an elbow joint which permits a free movement within certain limits without interfering with the operation of the gearing through which motion is transmitted, and the gearing is also fully protected. 47 denotes a bushing through which the bearing section 45 of the main shaft passes, and which is provided with a collar 46 which abuts against a shoulder 49, formed at the base of the jaws 36, 37, of the upper section of the elbow joint casing. 51 denotes a reduced section of the main shaft the screw threaded end 50 of which is screwed into the adjacent end of the bearing section 45, while the opposite end 55 of said reduced section is screwed into the socket piece 56 of the head clutch, which socket is fitted within a sleeve or tubular extension 69 of the lower casing of the shoulder joint which will presently be described.

The construction of the head clutch is shown in detail in Figs. 13 and 14, and in longitudinal section in Fig. 1. The clutch socket 56 has a collar 59 thereon which abuts against the inner end of the tubular part 69, and is provided with a longitudinal open-ended slot 58, in which a spline pin or feather 61 projecting from the clutch stem 60 is adapted to slide. The reduced end 62 of said stem is screw threaded and screwed into the lower section 64 of the shoulder coupling, and it terminates in a conical or tapered locking joint 63. The section 64 of the shoulder coupling is provided with claws or hooks 65 which engage the pivots 67 of a motion block 66 and are secured therein by snap springs 68. A similar coupling section 64' with a hook or hooks and snap spring or springs for engaging the cross pin or pivots of the motion block which extend at right angles to the pivots 67 is screwed onto the reduced screw-threaded end 77 of the driving shaft or spindle 80, thereby forming a universal joint connecting the parts 60 and 80. The terminals of the stem and shaft 60 and 80 are pointed as at 63, 63', respectively, so as to lock the parts when the same have been properly connected, and prevent accidental disconnection of the hooks. 79 denotes a collar on the driving spindle, and 81 the driving spindle bearing on which, between a shoulder on the bearing 81 and the collar 79, is fitted the tubular neck 76, of the upper spring barrel and guard of the shoulder joint. Said spring barrel and guard (Fig. 12) consists of a main cylindrical casing 74 formed integrally with a reduced cylindrical portion or neck 76 and an intermediate exterior flange or collar 75, and is supported upon the driving spindle or shaft 80 as above described. The lower spring barrel and guard consists of a similar main cylindrical casing 70 which is formed integrally with the sleeve or tubular extension 69, and an exterior cup 71 facing the collar 75 on the companion casing when the parts are connected. The casings or barrels 70 and 74 are grooved or threaded exteriorly as at 73, to permit a helical spring 72, to be screwed thereon, this spring being adapted to be seated in the cup 71 and compressed between the same and the collar 75, whereby the spring tends to normally hold the shaft sections in line with each other and to yieldingly resist flexion of the shaft.

In practice a shaft for the sheep-shearing machine should be provided with one bushing 25 in the lower section, and two such bushings in the upper section. The shaft proper or core may be formed in one piece or in a number of pieces screwed together as shown, a thick section being provided wherever there is a bushing. The casing or sheath is screwed or brazed to the bushings. Oil holes are provided in the casing between every bushing. The elbow casing 33 has been specially designed to cover and protect as far as possible the wheel 42 and pinions 31 and 43 through which the motion is transmitted. The amplitude of motion which the elbow joint permits is slightly greater than that which can be attained by the elbow of a man's arm. The overhead or driving spindle 80 is connected with the part 60 by a universal joint which permits the necessary flexure and the motion is communicated from the latter to the shaft by means of the pin 61 and the socket piece 56. The collar 79 supports the part 76, which is integral with the part 74. Onto the latter the helical spring 72 is screwed, the end being clipped as shown. The lower end of this spring is screwed in like manner onto the barrel 70 which is integral with the part 69. When the shaft is to be detached from the overhead connection, the parts 69 and 70, which are integral with one another, are screwed back off the spring 72, and thereupon the part 60 with its feather slips out of the socket 56. The parts are replaced by a reverse operation. The spring 72 supports the whole weight of the shaft and its attachments and allows a universal motion of about forty degrees, which is found ample for all practical purposes but may be increased if desired. The coupling is preferably of the ordinary block and pivot type. The modification of that construction shown in Fig. 1, or that shown in Fig. 19, may, however, be used instead. The snap springs 68 prevent the coupling hooks coming out of gear with the motion pivots. The hooks take the place of the eyes in the common coupling; they are made sufficiently large in the mouth to be easily hooked onto the motion pins. The coupling is hooked together before it is connected with the shaft; the ends of the shaft being prolonged as explained to form a lock for the parts when the same have been put together. An oil tube 78 is fitted as shown in Fig. 12 in the part 70, and is made sufficiently high on the outside to feed oil higher than the level of the collar 59. The leakage of oil past the part 56 will generally be found sufficient to lubricate the whole upper section of the shaft.

Referring to Figs. 15 and 16, 94 is the tail shaft of a shearing machine or other apparatus as aforesaid; 95 reduced part of such shaft screwed; 96 locking horn or point; 97 tail shaft bearing; 98 sleeve thereon; 99 hub or coupling screwed onto the part 95 and acting as a collar to keep the parts 94, 97, and 98 in position relatively to one another; 100 claws of coupling; 101 motion block; 102 motion pins; 103 hub of upper coupling claw; 104 trunnion pins on part 98; 105 bayonet sleeve secured to the end casing 111 of the shaft; 106 bayonet jaw; 107 screwed end of shaft; 108 neck or stem of sleeve 105 screwed to the shaft casing 111; 110 shaft core; 112 neck or stem of cup 113 screwed onto the part 111 and forming a bearing for the shaft section which passes through it; 114 helical spring in compression; 115 hub of intermediate coupling hook; 116 claws of hook; 117 motion block; 118 motion pins; 119 coupling hook; 120 neck or stem of sleeve 121; 122 trunnions on part 121; 123 screwed end of shaft; 124 hub of coupling hook; 125 claws on same; 126 motion block; 127 motion pins; 128 hub of coupling hook; 129 screwed end of driving spindle 130; 131 rotatable bayonet sleeve; 132 collar screwed onto the head bearing 133 and supporting the sleeve 131 and through it the whole shaft.

Referring to Fig. 17, 82 are the shaft cores through which power is transmitted; 83 casing tubes; 84 oil spaces; 85 necks of sheath cups 86; 87 lips on parts 86; 88 helical spring in compression; 89 helical ridges on the parts 86 to grip the spring 88; 90 body of coupling hooks; 91 claws of same; 92 motion block; 93 motion pins. This form of joint casing may be used generally in connection with universal joints. The cups 86 are made to very nearly inclose the joint as shown and so afford it better protection and prevent the spring 81 from fouling it; they may also be made so as to prevent undue flexion of the joint by meeting at the edges when the limit has been attained.

Referring to Figs. 18, 19 and 20, 135 is the shaft core; 136 the casing tubes; 137 oil space; 138 cup ring screwed onto the shoulder ring 139; 140 shoulder on ring or sleeve 139; 141 bushing screwed into the end of the tube 136; 142 collar on the end of the bushing 141; 143 helical spring in compression; 144 motion block; 145 motion pins; 146 coupling hooks; 147 hubs of same; 148 conical ring washer; 149 locking horns or points; 150 cup corresponding with the cup 138. The shaft may be made in as many sections as may be required, each preferably about six inches long. The flexion of the joints should not be permitted to exceed forty degrees. The spaces between the shaft and the casings form oil chambers which are fed through oil caps in the casings.

In operation, the driving spindles are usually set overhead. When this is so the oil fed into the oil chambers lubricates the lower bearing of the casing, and the leakage therefrom serves the coupling and the upper bearing of the section next below; if the leakage should be insufficient for this purpose lubrication of the upper bearing may be effected by elevating the lower end of the shaft so as to make the oil run toward the head. The rings 148 are of soft metal and are seated in recesses in the end bearings 141 to which they are fitted. The ends of the springs 143 are bent in and pass through holes bored through the ring 139 and the tube 136 which are thus locked together; otherwise they are made to pass through the base of the cup as shown in Fig. 1. Both claw hooks of each pair are identical in construction. The mouths are sufficiently wide to admit the motion pins into them; these pins are subsequently secured in and prevented from becoming unlocked from the claws of the hooks by the horns which are formed on the ends of the shaft to which the claws are secured by screwing, and which extend almost to the motion block. The coupling can be immediately taken apart by screwing back the claws whereby the horns are withdrawn and the jaw left open. The helical springs which inclose the joints are arranged so as always to be in compression; and they are sufficiently strong to exert upon the couplings the degree of tension necessary to prevent "kinking" and to prevent undue flexion of the shaft. The construction of the parts adjacent to the driven machine must be adapted to operate with the tail shaft and tail bearing thereof. In uncoupling the shaft shown in Figs. 15 and 16 from the machine, the parts 98 and 108 are grasped, one in each hand, and pulled apart (thus throwing the helical springs which inclose the joints into compression), and are then twisted relatively to one another so as to disengage the trunnion pins 104 from the jaws 106. The clamping claw 103 which has jaws open permanently may then be unhooked off the motion pins 102. These parts are recoupled by a reverse operation and are maintained in working position by means of the helical springs. The construction of the head coupling and the method of latching and unlatching it are practically identical. If the helical springs are made sufficiently stiff it will be unnecessary to use the locking horns. It is preferred, however, that only one claw of each pair should be provided with these attachments, in order that any one of the couplings may be taken adrift without unscrewing the claws. The bases or hubs of the claw hooks form collars on the shaft sections, and take against the end bearings of the casing tubes and prevent end play of the shaft cores therein, except in the case of the cores at the extreme ends which are made of surplus length to allow of the coupling and uncoupling of the bayonet catches at the ends of the shafts. In an alternative construction, casing tubes are not used, but collars are secured to the shaft cores and against such collars the bases of the parts 85, 108, 112, or their equivalents bear. In such a construction the springs operate as previously described. It is preferred, however, that the section of shaft next the driven machine should be incased. The conditions which the helical springs should fulfill are, to resist elastically flexion of the shaft at the joint at which they are fixed, and to operate together to keep the joints or couplings in tension by bringing about a tendency to separate the several sections from one another. When the bayonet coupling gear shown in Figs. 15 and 16 is used, it is essential that the construction be such that the sleeve 105 may be slid back relatively to the shaft 110 and the sleeve 98. When the section of shaft next the machine is incased the construction shown in Fig. 15 is employed, but when it is not incased a collar or ring is fixed upon the shaft and a helical or volute spring is placed around the shaft, bearing at one end against such collar or ring and at the other against the part 108. The operation of locking and unlocking is in such case performed in a manner precisely similar to that before described.

In lieu of the bayonet coupling gears described, spring couplings as employed for the intermediate joints may be used. Horns such as 63 may also be used for the purpose of locking the ordinary hook and eye coupling used in some forms of flexible shafts.

We are aware that flexible or jointed shafts are known which consist of two rigid sections provided with shoulder, elbow, and wrist flexible connections, and we do not claim such a combination broadly as our invention. We do not, however, restrict ourselves specifically to the construction of the several parts as described herein and as illustrated in the drawings, the mechanical details generally being capable of modification and variation within the limits of the invention as set forth in the claiming clauses which follow.

Having now particularly described and ascertained the nature of our said invention and in what manner the same is to be used, we declare that what we claim is—

1. The combination with the main shaft, of the clutch tube or casing having the bayonet slot therein, the tube bearing carrying the locking pin or pins, the clutch shaft rotatably fitted in said tube bearing, a coupling between said main and clutch shafts adapted to permit surplus longitudinal play, and a spring adapted to keep the bayonet joint locked, substantially as described.

2. In combination with the main shaft, the clutch shaft and the clutch coupling for detachably connecting said shafts, comprising the socket or cup on the end of the clutch shaft having the triangular pieces cut therefrom and the stem of the main shaft adapted to enter said cup and provided with a key pin or pins for engaging the oblique and vertical faces of the cut parts, substantially as described.

3. In a clutch or coupling for shafting, the combination of a working shaft carrying at its end an enlarged part axially recessed or bored to form a cup having notches in its sides, and a driving shaft the end of which is adapted to enter the recess in the working shaft, said driving shaft carrying a pin or pins which are adapted to engage the notches in the sides of said cup, substantially as described.

4. In combination with the main shaft bearing section, the clutch shaft, the coupling detachably connecting said parts, the clutch tube or casing and the sleeve rotatable therewith, the tube bearing having the swing casing integral therewith, the bayonet joint detachably connecting said clutch tube and casing, and a spring for holding the bayonet joint locked, substantially as described.

5. In flexible shafting for transmitting rotary motion, the elbow joint casing comprising a tubular shaft-bearing or sleeve terminating in upper and lower jaws or cheek-pieces, a tubular shaft-bearing or sleeve terminating in a guard cheek lying between said jaws, and a journal pin passing through apertures in said guard cheek and jaws, in combination with shaft sections journaled in said bearings or sleeves with pinions on their ends, and an intermediate bevel wheel meshing with said pinions; the said gears being inclosed by said guard cheek and jaws, substantially as described.

6. The elbow joint for flexible shafting comprising the tubular bearing section or sleeve having a dished guard-sheet integral therewith, a second tubular bearing section or sleeve having a bifurcated portion forming upper and lower jaws between which said guard cheek is fitted, a pivot pin passing through apertures in said cheek and jaws, and a bevel wheel journaled on said pin and adapted to engage bevel pinions on the ends of adjacent shaft sections projecting through said tubular bearings, substantially as described.

7. In flexible shafting for transmitting rotary motion, the combination of a series of tube sections inclosing sections of shafting, bushings or tubular bearings inclosed within said tube sections, enlarged shaft sections rotating in said bushings and intermediate shaft sections reduced in cross section to form oil-spaces within the tubing, substantially as described.

8. In flexible shafting for transmitting rotary motion, the combination of a series of tube sections for inclosing sections of shafting, bushings or tubular bearings inclosed within the ends of the adjacent tube sections, and a line of shafting consisting of bearing sections working in said bushings and reduced sections forming oil spaces within the inclosing tube sections intermediate the bushings, substantially as described.

9. A flexible jointed shaft comprising shaft sections incased in tube sections carrying end bearings, said shaft sections and tube sections being connected by universal joints or couplings and tension springs, respectively, substantially as described.

10. A flexible jointed shaft comprising shaft sections incased in tube sections provided with shaft bearings, the shaft sections between the bearings being reduced to form oil reservoirs within the tubes, universal joints or couplings uniting the shaft sections and springs arranged at such joints and operating upon the tube sections so as to keep the couplings in tension and resist flexion of the shaft, substantially as described.

11. In a shoulder joint coupling for flexible shafting for transmitting rotary motion, the combination with shaft sections, of tubular bearings for the same, a resilient and flexible connection between said bearings, and a universal coupling for said shaft sections, substantially as described.

12. In flexible shafting for transmitting rotary motion, the combination of a shaft section carrying at its end an axially bored cylindrical clutch socket slotted longitudinally thereof, a stem sliding in said socket and provided with a pin or feather working in said slot, a driving shaft, bearings for said clutch socket and driving shaft and a block and pivot coupling connecting said driving shaft and stem, substantially as described.

13. In flexible shafting, the combination of shaft sections, a flexible joint between the same, bearings for the shaft sections provided with cups or barrels, and a compressed spring between the cups or barrels, substantially as described.

14. A flexible shaft consisting essentially of a number of shaft sections united together by universal couplings and springs which keep the couplings in tension and offer an elastic resistance to the bending of the shaft.

15. A flexible shaft consisting essentially of a number of shaft sections each incased in sections of tube, said sections of shaft being united in a universal joint or coupling, and said sections of tube secured together at their ends by helical springs which are set so as to yieldingly resist flexion of the shaft and to tend to set its sections in line with one another, substantially as described.

16. A flexible tube for inclosing or incasing a flexible shaft, consisting of a number of rigid sections held together by such shaft and by couplings connecting the parts thereof, and secured at the ends by helical springs which are set so as to elastically resist flexion of the shaft and to tend to set its sections in line with one another, substantially as described.

17. The combination with the sheath or casing for vertical shafting having an outer guard or barrel and an inner collar inclosing said shafting, of an inverted-siphon oil-tube, the outer or receiving end of said oil-tube being sufficiently high to feed oil higher than the level of said collar, substantially as described.

18. The combination with the working shaft and the driving shaft flexibly coupled thereto, of the shoulder joint casing having the tubular extension, the slotted socket secured to the head of the core or rotating part of the working shaft and moving in said extension, the stem fitting within said socket and having a pin or feather thereon engaging the slot in the socket, and a resilient and flexible support for said casing, substantially as described.

19. The combination with the lower spring barrel having the tubular extension integral therewith, of the slotted socket piece fitting within said extension, the stem fitting said socket piece and having a pin thereon engaging the slot in the socket piece, the driving shaft, the bushing, the upper spring barrel having the tubular neck fitting said bushing, the universal coupling connecting said stem and driving shaft, and the helical spring fitting upon said barrels, substantially as described.

20. In combination with the shaft sections, the universal coupling comprising the claws or hooks fixed to the ends of the shafts and the motion block with pivot pins for engaging said hooks, and horns or projections on the ends of the shafts for locking the couplings, substantially as described.

21. A flexibly jointed shaft for transmitting rotary motion composed of universally-jointed shaft-sections incased in tube-sections in which the shaft-sections have their bearings; said tube-sections being coupled together coincidently with the shaft couplings by resilient, separable connections, substantially as described.

22. In a flexible shaft composed of shaft sections and tube sections in which the shaft sections have their bearings, a flexible joint for coincidently coupling the tube and shaft sections and adapting the same to be readily disconnected, said joint comprising a universal coupling uniting the adjacent ends of the shaft sections, and a resilient coupling separably connecting the adjacent ends of the tube sections, substantially as described.

JOHN MOFFAT.
WILLIAM W. VIRTUE.

Witnesses:
W. J. SPRUSON,
W. J. DAVIS.